Figure 1:
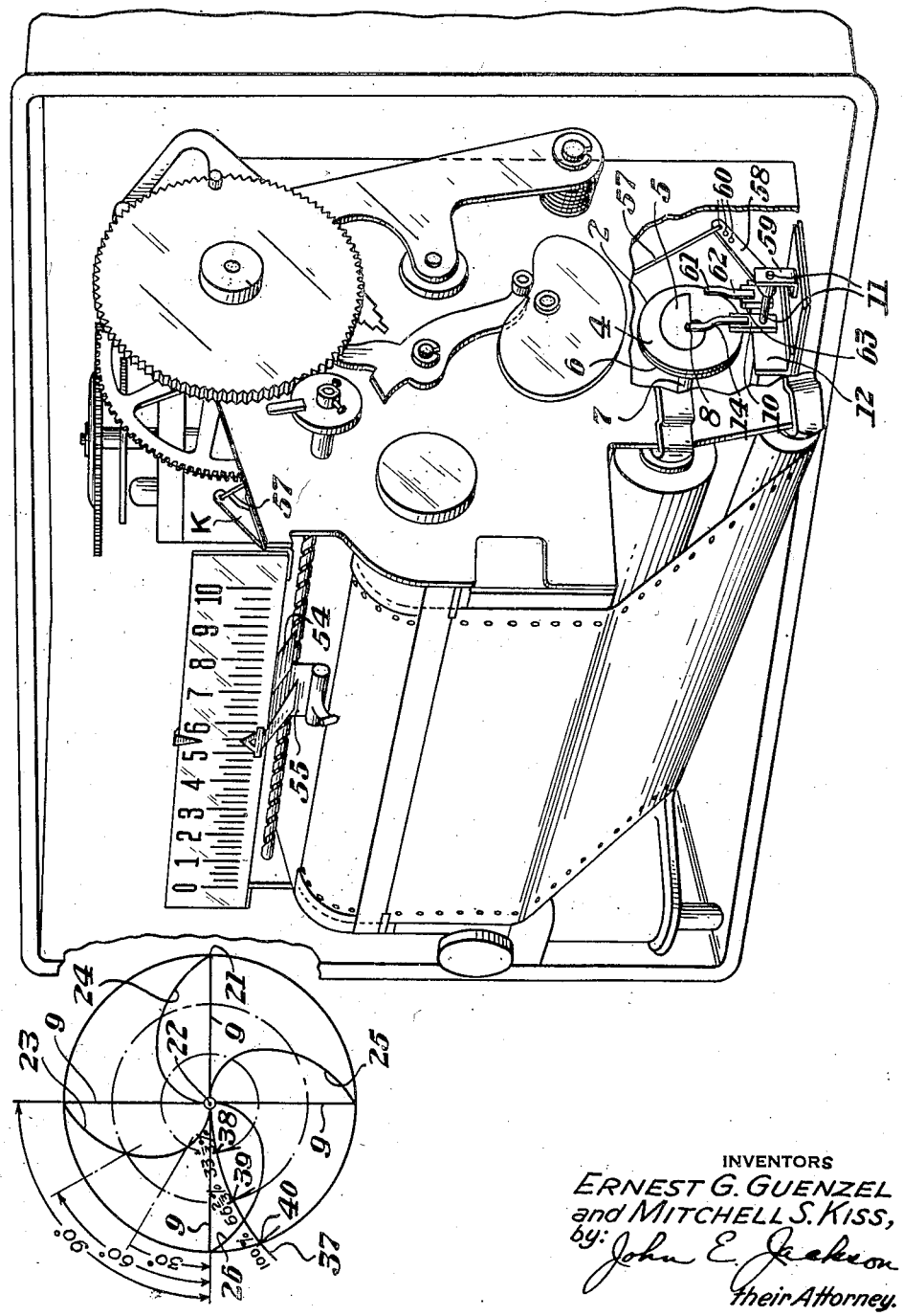

INVENTORS.
ERNEST G. GUENZEL
and MITCHELL S. KISS,
by: John E. Jackson
their Attorney.

Nov. 21, 1944.   E. G. GUENZEL ET AL   2,363,413
VARIABLE TIME CURRENT INTERRUPTER FOR CONTROL OF FURNACES
Filed April 11, 1942   4 Sheets-Sheet 3

INVENTORS
ERNEST G. GUENZEL
and MITCHELL S. KISS,
by: John E. Jackson
their Attorney.

INVENTORS
ERNEST G. GUENZEL
and MITCHELL S. KISS,
by: John E. Jackson
their Attorney.

Patented Nov. 21, 1944

2,363,413

UNITED STATES PATENT OFFICE 2,363,413

VARIABLE TIME CURRENT INTERRUPTER FOR CONTROL OF FURNACES

Ernest G. Guenzel and Mitchell S. Kiss, Cleveland, Ohio

Application April 11, 1942, Serial No. 438,628

1 Claim. (Cl. 200—28)

This invention relates to a variable time control means for electric current control systems. The variable time control unit is particularly well adapted for application to electrically heated furnaces, although it may have various other applications and also may be employed in connection with furnaces having heating units other than by electrically heated units, including gas, oil, coal or coke.

One of the objects of this invention is to provide a variable time current interrupter of simple, rugged and compact construction having means for readily and accurately varying the intermittent and consecutive cycles or time periods during which the current is alternately on and off, over a wide range and almost infinite number of variable adjustments between the two limiting conditions in which first the current is on continuously and second in which the current is continuously interrupted.

The construction and arrangement is such that the relative time periods during which the current is on and off, may be accurately calibrated and expressed on a percentage scale of one hundred proportional parts of a preferably, though not necessarily, uniformly graduated indicia scale, representing some unit of time. The particular unit of time chosen may be a minute, or other unit, and may be varied to suit particular conditions and circumstances, by varying the speed ratio between a synchronous constant speed driving unit, such as a telechron synchronous motor, employed in electric time pieces, and the driven member. The driven member includes means forming part of the circuit for directly interrupting the electric circuit for variable periods, without the interposition of other mechanical elements as actuators for operating other circuit interrupting means or switches, such as mercury switches or other contactors.

We are familiar with prior art variable time interrupters employing a rotatable cylindrical roll having a raised long pitch thread-like cam on the surface thereof which actuated an independent switch mechanism, of the mercury switch or abutting contact type, through a mechanical connection, and also necessitating the use of additional mechanical means such as a worm or screw member, reversibly actuated by a suitable means, and a nut-like member for moving the two contacts of the switch or circuit interrupting means bodily, parallel to, and along the axis and longitudinally of, the cylindrical roll having the long pitch raised cam on the surface thereof. In such prior device no part of the cylindrical roll or of the raised long pitch cam-like surface, formed any direct part of the electric interrupting circuit. The variable time period of actuation of the mechanical mechanism interposed between the circuit interrupter and the elongated cylindrical roll was effected, not by any adjustment of one of the electrically live parts of the current interrupter, radially of the axis of the cylinder, but only by a bodily adjustment or movement of the mechanical mechanism and the current interrupting means, as a unit, along the axis of the elongated cylindrical roll so that for each position of the mechanical actuator for the circuit interrupter along the axis, an actuating feeler pin having one end traveling in contact with the surface of the elongated cylindrical-cam, would during one revolution of the cylinder be successively moved to a raised and lowered position, for varying periods of time dependent upon the extent of the concentric high and low portions of the cam-like surface at that particular section transverse of the axis of the elongated cylindrical roll.

One of the objects of the present invention is to provide a readily adjustable variable period current interrupter, which will overcome certain of the above noted objections of the prior art devices and which will enable a small compact unit of simple construction and minimum number of parts to be employed.

A further object is to provide a variable period current interrupter of a rotatable disk type, in which the adjustment of the variable time period of the current interrupter for any part of a predetermined cycle or unit of time, as required or agreed upon, may be determined and controlled by adjustment of one of the live circuit carrying members radially of the rotating disk-like member, so that the time period of interruption may be varied between the two limits of either continuous interruption (or open circuit) or continuous uninterrupted (closed circuit) or any infinite number of intermediate positions forming a proportionate part of the standard unit or period of time, varying from zero to one hundred per cent of such time unit.

A further object is to provide a variable time current interrupter in which the means for adjusting the variable period is of the rotating disk type functioning in cooperation with means for readily effecting adjustment of a circuit interrupter contactor, radially of the disk, by a simple swinging movement about a pivotal support, so that the degree of adjustment may be readily translated to suitable indicia, such as indicating scale and pointer, the arrangement being such as as to be readily adapted for either manual adjustment or for automatic adjustment or movement of the circuit interrupter radially of the disk in either direction. This is a particularly desirable feature when a variable time current interrupter of this type is employed in the control of furnaces in the heat treatment of metals and other materials where temperatures and rates of heating either increase or decrease, or maintenance of certain temperature ranges are the requirements of certain programs of heat control. The simplicity of structure and compactness of the unit readily adapt it as a unit capable of inclusion in and as a coordinating part of other control instruments, either in effecting improved and supplemental functions or in displacing other more complicated yet less effective devices, and at the same time effecting improved and new results and a flexibility of control which the displaced devices were incapable of obtaining.

A further object is to provide in a system of program control in the heating of furnaces, a simple means of effecting a reversal of direction of rotation of a driving shaft, utilized in effecting adjustment of the variable time period of current interruption. In such system the conventional small, inexpensive shading coil self-starting single phase synchronous type of telechron motor is employed, the reversal of the direction of the driving shaft being effected, not by change in the electrical connections of the single telechron single phase motor, which reversal is usually not provided for and is not possible in the conventional functioning of such motor in the usual clock or timepiece, but such reversal of direction of the driving shaft may be conveniently effected by employing an additional identical synchronous telechron motor unit, but mounting or coupling the same so that the driving shaft of the second telechron unit will be turned about through an angle of 180° as compared with the first telechron unit and coupled to the same shaft. Under such an arrangement when the field of one telechron synchronous motor is energized, the shaft will be driven in, say a clockwise direction, and when the field of the other telechron unit is energized, the shaft will be rotated in an opposite or counterclockwise direction. Such an arrangement is desirable for effecting a reversal of direction where a relatively inexpensive single phase alternating current telechron type of motor is available, because even in those types of single phase telechron motors which are self-starting because of the employment of the shading coil principle, such single phase motors are not reversible in direction. Of course, it is true of all single phase types of motors, when not provided with shading coils or other special starting means, that they possess no starting torque whatever, but they are capable of accelerating to almost synchronous speed, if independently started in either direction, and if the torque requirements are not severe. It follows from these characteristics of a simple single phase alternating current motor, that such a motor alone is neither self-starting nor reversible, even though the main line leading to the motor is reversed, or even though the motor were placed across the lines of a different phase of a polyphase system as a main source of current supply. Of course, there may be certain conditions and applications of use, under which the primary control unit for effecting the adjustment of the successive time periods of open and closed circuit conditions may be driven at a substantially constant speed by any other suitable source of power unit than a telechron type of motor having such a constant speed characteristic under a substantially light and constant load or torque condition, such as is required by a driving force merely to rotate a disk-like member or a contactor arm through a train of suitable gearing. Under such conditions a small shunt motor for a direct current source of supply or a small inexpensive universal type of motor operable on either alternating or direct current, may be employed.

A further object is to provide, as a unit, a variable time current interrupter of such simple and compact construction that it may be readily adapted, either singly or in series of units, for mounting and control, so that a plurality of control circuits requiring timing and coordinating either in series or parallel, may be effected without an unduly complicated system, either mechanically or electrically.

In the accompanying drawings a preferred form of the variable time current interrupter as a self-contained unit is shown with manual control for varying or adjusting the relative periods during which the control circuit is established or interrupted.

Another modification is shown in which the variable time current interrupter is adapted for use in connection with a commercial type of potentiometer, the simplicity and compactness of construction and the ease with which connections for variation of the period controlling element may be made, rendering this unit particularly suitable for a wide range of application.

Still a further modification is shown in which an automatic control is utilized, one particularly desirable feature of such automatic control being the simple manner in which a reversal in direction of movement of the control element for varying and determining the suitable periods during which the closed circuit conditions are maintained and also the open circuit conditions.

Referring to the drawings:

Figure 1 is a perspective view showing a commercial type of potentiometer which may be utilized in controlling temperatures and the heating programs of furnaces; the mechanism is shown in a position in which it is swung outwardly from its containing case and shows the manner in which the variable time current interrupter may be readily mounted in the instrument and the control element for varying the duration of the current interruption, readily connected with other parts of the commercial instrument, to cooperate therewith.

Figure 2:
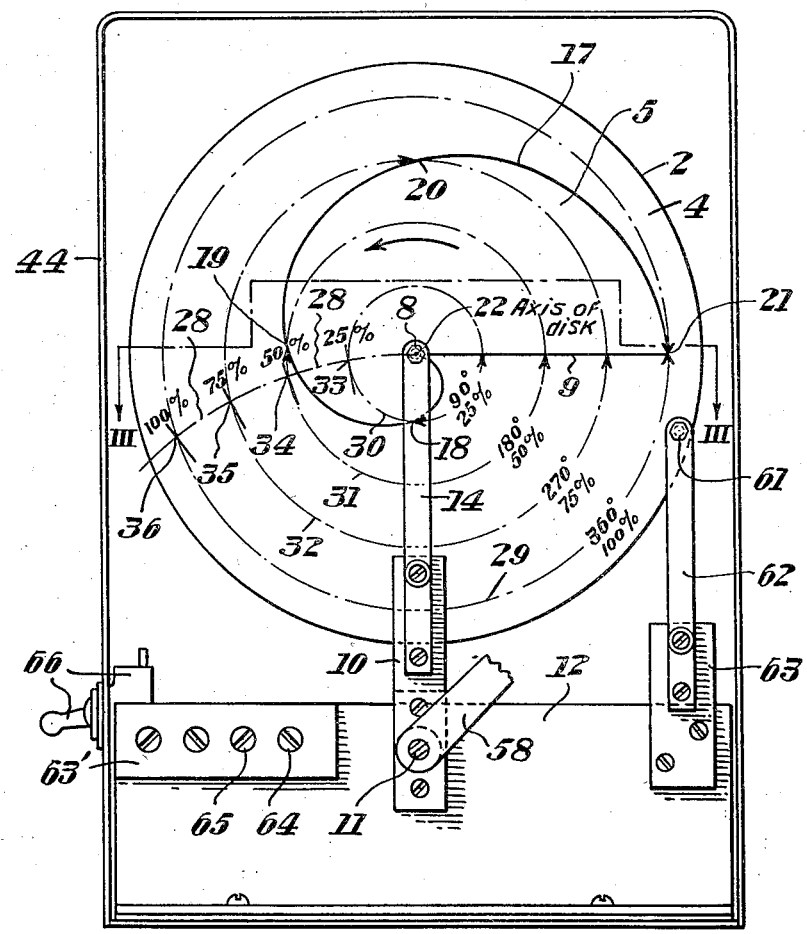

Figure 2 is an elevation looking at the rear of a manually adjustable compact and portable unit, showing particularly the face of the rotating disk and the flat spiral elements formed of insulating and conductor material respectively; there is also shown in this view the relative arrangement of the contactor movable radially of the disk to control the relative duration of the successive periods during which an electrical circuit may be established or interrupted respectively.

Figure 3:
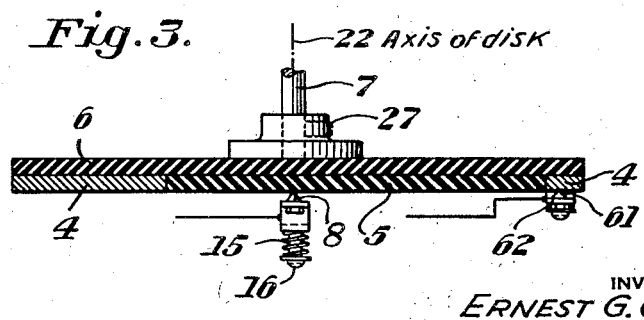

Figure 3 is a section of the disk taken on line III—III of Figure 2, showing the insulating and conducting portions of the disk on said section, and also indicating the relative position of the radially adjustable contactor, and also of a second contactor in a relatively fixed position in continuous contact with the conductor portion of the disk face.

Figure 4:
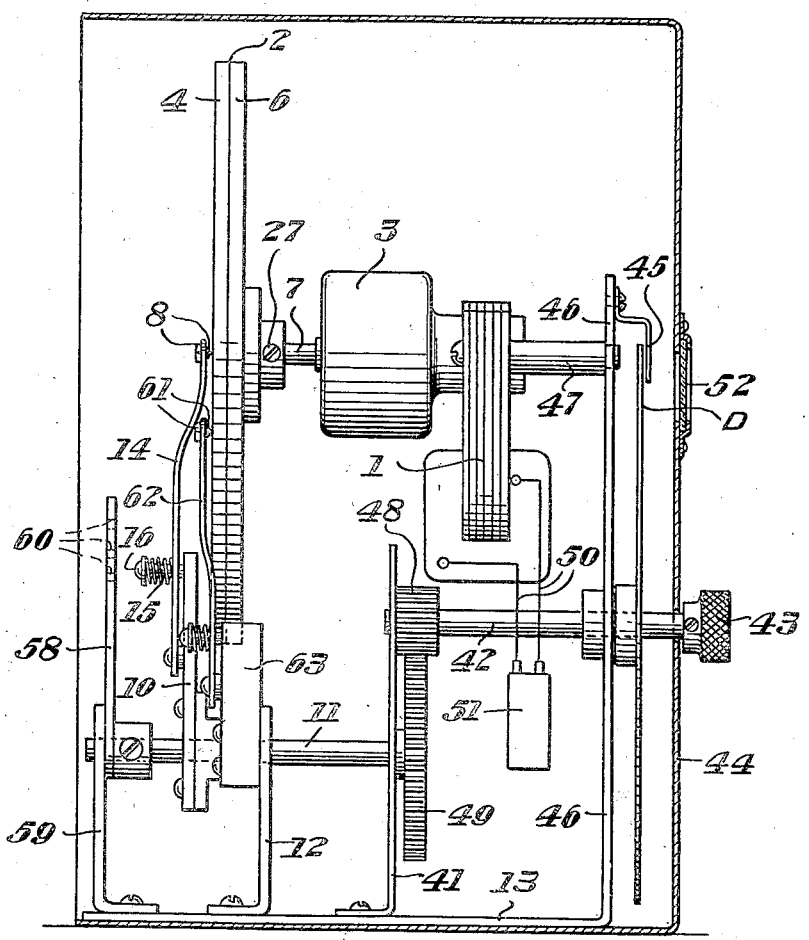

Figure 4 is a side elevation of Figure 2 showing the various elements of the variable time current interrupter in their assembled relation as a portable compact unit, which unit is positioned within a casing having a panel opening in one side thereof through which a pointer and indicating dial may be observed; a shaft extension is provided with a control knob for manual adjustment of radially movable contactor which rides upon and traverses the face of the disk.

Figure 5:
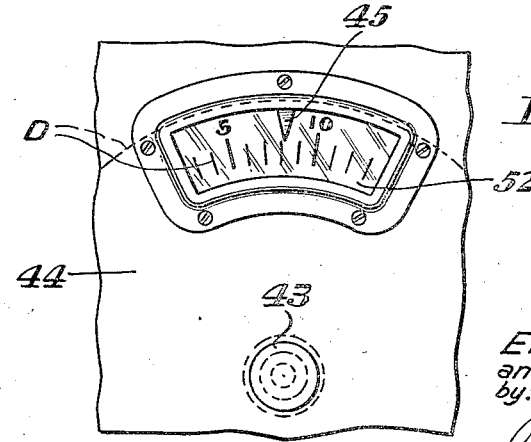

Figure 5 is a fragment of a front elevation of Figure 4 showing the panel with the aperture therein for viewing the pointer and the indicating dial, which as shown, is graduated in per cent input; the control knob for manual adjustment is also shown.

Figure 6:
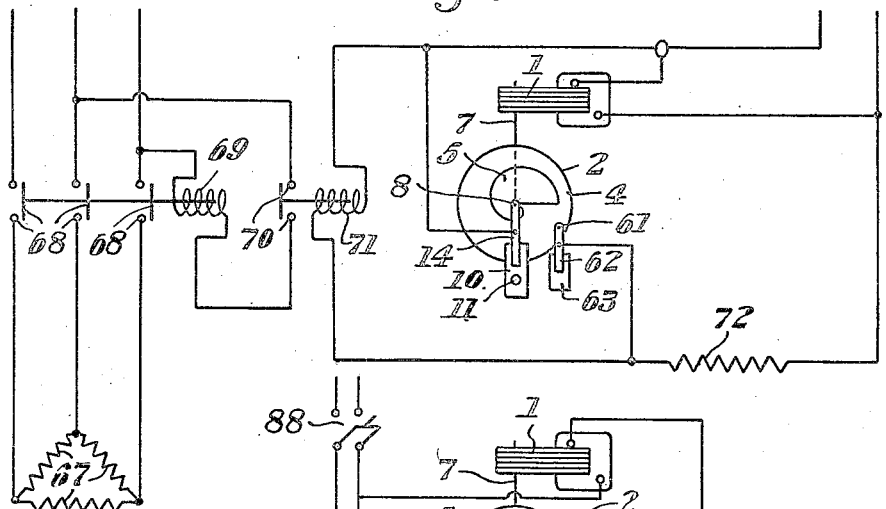

Figure 6 is a wiring diagram showing one application of the variable time current interrupter to a circuit which directly controls the circuit for the heating elements of a furnace through a relay. As shown, the control circuit operates on 110 volts, and the main load or heating circuit is connected to a 220 volt alternating current three phase circuit, it being understood, of course, that by proper design other voltages may be employed and both the control circuits and the load circuits may operate on the same voltage. However, it is desirable to operate the control circuits on as low a voltage as is conveniently available in order to reduce the arcing or sparking at the points of interruption of the circuit between the conducting portion of the disk and the contactor in wiping engagement therewith.

Figure 7:
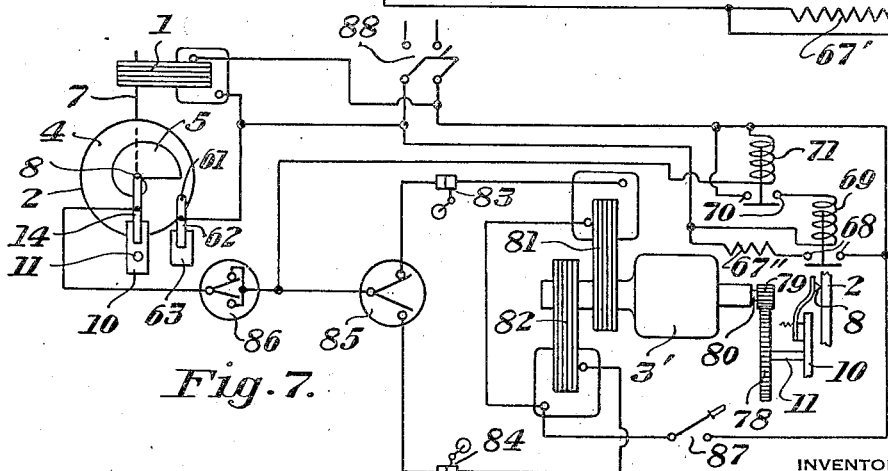

Figure 7 is a circuit diagram of a modified form of indirect or program control in which a motor operated control setter for automatic operation and control is employed. In order to permit the proper functioning of the setter control element, it is necessary that the effective controlling element be capable of movement in either direction, that is, it should be reversible. In the present instance, the radially movable contactor is the element which is required to be moved across the face of the disk in a direction either toward or from the axis of the disk. As shown in this Figure 7, a plurality of telechron synchronous motor units are employed in a manner to be hereinafter more fully set forth.

Figure 8:
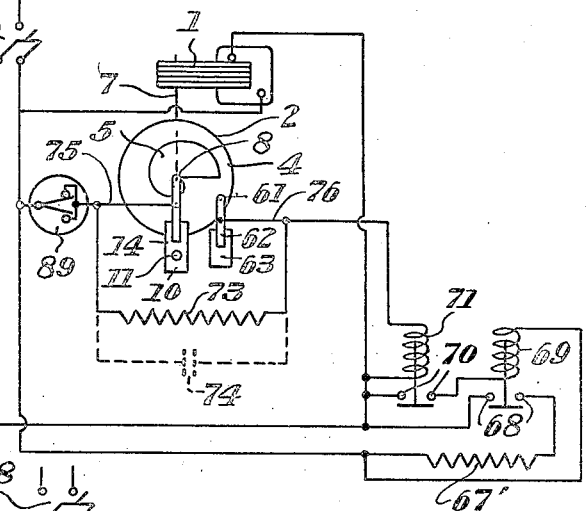

Figure 8 is a circuit diagram showing a modified form of direct control of a circuit for a main heating element through a relay, the particular modification from that shown in Figure 6 being that a modified means and circuit connection is employed for minimizing the tendency of sparking or arc formation at the time of circuit or current interruption between the adjustable contactor as it leaves the conducting face portion of the disk and passes upon the insulating portion thereof. Specifically, a very high resistance or a condenser is connected in shunt or parallel with the point at which the circuit is interrupted. The values of the high shunting resistance or the condenser are such as not to interfere with the normal functioning of the relay, and the armature and contacts controlled thereby.

Figure 9 is a view showing a modified form and arrangement of flat spiral sections on the face of the disk. As shown, four spiral sections are disposed on the face of the disk, each spiral representing an angular movement of 90°. By such an arrangement, that is, by employing various disks having a different number of spirals on the face thereof, the rate or frequency of a cycle, said cycle including a period of current-on and current-off, may be varied without the necessity of varying the speed of the motor driving unit or without the necessity of employing different gearing to obtain different speed ratios between a driving and a driven member.

As shown in Figures 2, 3 and 4, the variable time current interrupter includes a telechron synchronous motor of the self-starting type, designated generally as 1, a disk member designated generally as 2, which is rotated at a suitable speed by the motor 1, through a suitable gear reduction device designated generally as 3. Various speed reduction devices are available for use with the ordinary telechron synchronous type of motor so that various disk speeds may be available from one to sixty revolutions per minute. In the present application, it is desirable that the speed of the disk be as low as possible in order that the wear on the disk and all additional electrical contactors used on the disk be reduced to a minimum.

In the present application, a disk speed of one revolution per minute has been found satisfactory. With reference to the factor of speed in terms of revolutions per minute of the disk, it should be noted that by employing a variable time current interrupter of the type constituting the subject matter of the present invention, a very wide range of control is possible in the rate of heating or cooling, or in effecting a straight line or uniform temperature control, depending upon the character and size of the furnace, that is, whether it be large or small, and also upon the character of the charge in the furnace. For example, a very small furnace with a light charge would have a rapidly changing temperature, when the current is either on or off, and thus would require a fairly high speed disk or a longer period represented by the current on, in order to maintain relatively constant temperature, by what may be termed a straight line control. On the other hand, if the furnace contained a heavy charge of material, the temperature fluctuation would be slower, and either a slower disk speed could be used or the duration of the current-on period, during one revolution of the disk, could be reduced.

As shown in Figure 3, in section, and in Figure 2, in elevation, the disk includes a face portion having a sheet or disk of conductive material such, for example, as copper or other suitable material, the conductor portion of the disk being generally designated as 4. A disk or sheet of insulating material, such as fiber, is formed at its perimeter as a flat spiral having the inner end at substantially the axis of rotation of the disk and the outer end terminating within the outer perimeter of the conductive disk, and at the end of a radial line extending from the axis of the disk, the particular spiral shown in Figure 2 representing that which is generated or traced by a point receiving at a uniform rate from the axis and having a uniform angular velocity and passing through 360°, or one revolution. A portion of the face of the conductor disk is cut out to coincide with the spiral contour of the insulator disk, the insulator disk being designated generally as 5.

As shown in Figure 3, the spiral insulator disk 5 and the conductive disk 4 are preferably of the same thickness so as to have the outer faces thereof in the same plane. By having the outer faces of the copper and fiber disks in flush relation, any spring pressed contacts sliding over the face of the disk are not required to ride over the projecting or raised portion of the disk, as would be the case if the insulator and conductor surfaces were in different planes.

The conductor and insulator sections forming the outer face portion of the disk are preferably carried by a backing disk 6 which preferably is also formed of insulating material. It should be understood that various changes and modifications may be made in the construction of the disk, in a manner well known to those skilled in the art. Various types and kinds of insulating materials may be employed, such for example, as some of the suitable plastics well known in the art, rather than the fiber insulator.

The assembled disk 2 may be suitably mounted on the shaft 7 which is driven by the motor 1 through suitable speed reduction mechanism 3, as hereinbefore stated.

Another essential element of the variable time current interrupter is a radially movable and adjustable contactor 8 which is in sliding contact with the face of the disk so that as the disk rotates, the contactor 8 will engage different portions of the conductive material of the disk, and different portions of the insulating portion of the disk face, for different periods of time in succession, corresponding to conditions of current-on and current-off, depending upon the particular position of the contactor 8 as it traverses the face of the disk in moving from the axis of the disk outward toward the perimeter thereof. It will be clear that with the contactor at the axis, such contactor will be continuously on the insulator section and such position of the contactor will correspond to a continuously open circuit position. On the other hand, if the contactor moves to a position approaching the perimeter of the disk, it will reach a point just short of the perimeter where it will be in continuous contact with the conductive material on the face of the disk, and will correspond to a continuously closed position, for an electric circuit of which the contactor and the disk face form a part.

By adjustably positioning the contactor at any position intermediate the two limiting positions above noted, and corresponding to current-off and current-on positions, an infinite number of intermediate positions may be had and might be expressed on a percentage basis, the particular percentage meaning that an adjustment in the position of the contactor may be effected so that a circuit may be either established or interrupted for a particular time period represented as a percentage of the time unit employed for making one revolution of the disk. By utilizing the form of spiral shown in Figure 2, which is commonly known as the Archimedes spiral, the variation in the percentage of the particular unit time period for one revolution will be in direct proportion to the extent of movement of the contactor along the radial line 9 connecting the outer and inner ends of the spiral forming the perimeter of the insulating member on the face of the disk, and in which said spiral represents uniform movement throughout 360°.

As shown in Figures 2 and 4, the contactor 8 is mounted at the end of an arm 10, the other end of said arm being mounted on a shaft 11 which, as shown, is mounted in a bracket 12 and is supported in spaced relation above the base 13. Preferably the arm 10 may be formed of fiber or other insulating material, and, is provided with a spring pressed conductor 14 at the outer end of which the contactor 8 is mounted.

The inner end of the strip conductor 14 is fixed to the arm 10 and a spring 15 is interposed between the head of a stud 16 and the spring strip 14 in order to vary the pressure between the contactor 8 and the face of the disk. It is understood, however, that other suitable arrangements and disposition of the arm and contactor may be employed for effecting radial movement and adjustment of the contact point, to vary the duration of the consecutive, "time off" and "time on" periods.

One advantageous feature in the method of mounting the radial adjustable contactor, as herein disclosed, is that where the shaft upon which the contact carrying arm extends parallel to the axis of the disk, and is outside of the perimeter thereof, it requires a movement of the shaft throughout a relatively small arc, which arc is represented by the movement of the contactor 8 from the axis of the disk outward radially to a position approaching the rim or perimeter of the disk. Such an arc, as shown in Figure 2, is substantially less than 90°, and more nearly approximates, in fact, less than 45°. The particular arc traversed by the contactor 8 is indicated in Figure 2 by a dot and dash line. A series of concentric circles are also indicated, which circles intersect the flat spiral designated generally as 17 at points 18, 19, 20 and 21 corresponding to the different angular advancement of 90°, 180°, 270° and 360°, respectively, in the advancement and development of the Archimedes spiral during one complete revolution of the disk. In one sense, the radial line 9 closing the spiral by extending from the outer point 21 to the axis 22 of the disk may serve as a relative base line from which to start and from which to consider the angular advancement and rotation at a uniform rate, of a point which is at the same time moved radially outward from the axis 22 at a uniform rate, which in general defines the conditions under which such a spiral is traced or generated on a flat disk. A modified form of spiral arrangement is shown in Figure 9, which shows four spiral sectors 23, 24, 25 and 26, respectively, and would represent conditions in the original generation of the spiral in which the rate of radial movement of the generating point of the spiral would be the same as that employed in the generation of the spiral shown in Figure 2, but the rate of angular advancement or speed of rotation would be one-fourth of that employed in the generation of the flat spiral shown in Figure 2. Of course, modified conditions under which equivalent forms of spirals may be generated would be those under which the same angular velocity of the generating point is maintained, but in which the radial rate of speed were increased, as in this particular case, by a factor of four. By varying these two relative factors, namely, the rate of uniform radial movement, and the rate of uniform angular rotation, of the generating points, disks having various numbers of the spiral segments, such for example, as two, four, six or eight segments, or more, may be employed as the particular circumstances and conditions of use may require.

The employment of a multi-segment spiral disk rather than a single segment constitutes one means of reducing the speed of the disk and thus reducing the wear factor between the contactor which is in sliding or frictional engagement with the face of the disk. This may be done without sacrificing the wide range of control and adjustment of the successive current-on and current-off conditions for various percentages or proportional parts of a unit time period and varying between the two limiting conditions of a continuous closed circuit condition and a continuous open circuit condition. On the other hand, if it is desired to shorten the unit time period of a cycle including successively, a closed and open circuit condition, where a substantially constant speed motor unit, such for example, as a telechron synchronous motor, with a certain speed reduction unit, or a direct current motor of the shunt field type, having a substantially constant speed characteristic under substantially constant or slightly varying loads, this may be readily done without necessitating employment of a different speed motor or a different gear ratio unit, by merely employing a disk having the desired number of multi-spiral segments on the surface thereof. One of the advantages of the construction and arrangement of a disk-type of variable time current interrupter constituting the subject matter of this invention is the simplicity and compactness of the parts, and the ease with which, if and when desired, the disk 2 may be removed or replaced from the shaft 7 by merely loosening the adjusting or positioning screw 27. Of course, a different disk, such for example, as one having the desired number of multi-spiral segments on the face thereof, may be replaced with equal facility, in order to vary the duration of unit time period of a cycle of operation or condition as above defined. The simplicity of the structure and the flexibility and ease with which varying conditions may be met, together with the ease and simplicity of structure which may be employed in effecting the radial movement and adjustment of the contactor with reference to the face of the disk, are in marked and distinguishing contrast to the more complicated and elaborate structures of the prior art where a rotating worm or screw member, together with a carriage and switch mechanism thereon, such as the mercury switch, together with mechanical actuating means interposed between a cam surface on a cylindrical member.

Referring to Figures 2 and 4, it will be clear how the arm 10 carrying the contactor 8 may be turned or swung about its point of support on the shaft 11 so that the entire arm, including the spring conductor strip 14, may be free and clear of the face of the disk 2. This feature facilitates the ready removal of the disk from the shaft 7, either for replacement or substitution of another disk having a different type of spiral or the desired number of spiral segments. In the event that the contactor point 8 becomes pitted, corroded or worn, the same may be readily replaced by removing the spring conductor strip 14, without necessarily having to replace or remove the main arm portion 10.

Referring to Figure 2 showing the disk having the single spiral segment on the face thereof, and Figure 9 showing the disk having the multi-spiral segments on the face thereof, it will appear that the same radial movement of the contactor throughout a range of movement calibrated to represent various percentages of a particular time unit for the completion of one cycle including successive periods and conditions of closed and open circuit conditions respectively, may be employed. Of course, under the different conditions above noted, where the disk is driven at the same substantially constant speed, the particular time unit for a cycle of conditions or operations as defined herein, will be different.

In Figure 2, the different points on the radially extending arc 28, as traversed by the contactor 8, is indicated at each quarterly portion of the cycle requiring angular rotation of 360°. This complete cycle is indicated by one of the concentric circles 29. Other of the concentric circles are represented as 30, 31 and 32, which circles intersect the spiral at points 18, 19 and 20, respectively. The points 33, 34, 35 and 36 at which the concentric circles 30, 31, 32 and 29 intersect the arc 28 traversed by the contactor point, represents the percentages of 25, 50, 75 and 100 per cent respectively of a particular time unit for completion of a cycle of conditions or operations, as above defined. These quarter periods are uniformly divided, as here shown, and represent a quarter of the distance traversed radially by the contactor 8.

Figure 9 is a view showing the disk with the multiple sections, four as shown, and is somewhat similar to Figure 2, excepting, however, that while the scale of percentages representing 100 per cent on the radially extending arc traversed by the contactor point 8 is substantially identical with the corresponding line and arc in Figure 2, the unit of time representing one cycle of conditions or operations is represented by the time required for relative angular rotation and movement of and between the disk and the contactor, of 90° instead of 360° as shown in Figure 2. The percentages indicated on the radial extending arc 37 are designated as 33⅓, 66⅔ and 100 per cent at the points 38, 39 and 40, respectively. Each third period represents relative angular movement between the disk and the contactor, of 30°. In this figure, 90° represents the relative angular traversal for each period or cycle of operations and would represent the distance between the radial line of two successive spiral segments on the face of the disk.

A further feature of advantage in employing a disk and a contactor adjustable radially thereof, in the manner herein disclosed or by other equivalent means, is that the rotation of the control shaft 11 through a relatively short arc in either direction, for controlling the position of the contactor 8 on the face of the disk, enables a variable time current interrupter of this type to be applied readily as a self compact and portable unit, either for manual operation, for automatic operation, or for use as a unit in cooperation with other heat control instruments such as potentiometers of the Brown and other types.

As shown in Figure 4, the one end of the shaft 11 is rotatably carried in a bracket 41 which at its lower end is secured by a suitable means to the base 13. In order to adapt the variable time period and current interrupter to manual control and the movement of the shaft 11 to a relatively small arc so gaged and controlled that the position of the contactor 8 at any particular time may be definitely known, a suitable gear ratio is interposed between a shaft 42 and the shaft 11. An indicating dial D is attached to the shaft 42 and is calibrated to indicate the per cents of total time during which a closed circuit condition exists, during a cycle of operation. A suitable control knob 43 is mounted on the end of the shaft 42 and is available for manual operation from the outside of a casing or covering 44 in which the mechanism of the variable time current interrupter may be housed. A suitable fixed indicator pointer 45 may serve as a reference or guiding point to be used in co-operation with the indicating dial calibrated in per cent. The vertically extending member 46 serves as a bearing post for the shaft 42 and also as a means for positioning and supporting a substantially constant speed driving unit such as the telechron synchronous motor 1. As shown, the motor is supported in position by means of the stud 47. As shown, the indicator pointer is carried at the upper end of the bracket bearing member 46. The inner end of the shaft 42 is rotatingly supported in the bracket 41 so that said bracket, as shown, serves as a common support for the two shafts 11 and 42. Preferably, the train of gearing interposed between the shafts 11 and 42 are so proportioned that rotation of the shaft 42 by the knob 43 will turn the calibrated indicating dial through the full scale, which movement in turn will correspond to the two limiting positions in the radial movement of the contactor points across the dial face. As shown, the smaller gear 48 is mounted on shaft 42 and the larger gear 49 on shaft 11. The electrical connections to the motor are indicated at 50, said connections going through a suitable terminal block 51.

Figure 5 shows a fragment of the front panel of the casing, having a suitable aperture 52 therein through which the indicating pointer and the calibrated dial D may be observed.

Figure 1 shows the manner in which the variable time current interrupter is adapted to fit into the switch compartment at the lower back portion of a commercial potentiometer of the Brown type. The potentiometer is equipped with a regular commercial type of control bar K, a sloping step table assembly 54 and an appropriate pen carriage 55. The sloping step table 54 is part of the control carriage which may be set to any desired point on the scale of the potentiometer, calibrated as desired. The pen carriage 55 indicates the temperature of the furnace and, at the same time, a small roller on the pen carriage (not here shown but well known in the art) contacts the sloping step table 54 when the temperature of the furnace is within the throttling range of the preset control point. When this point is reached, a further increase in temperature causes the sloping step table 54 to raise. Movement of the step table 54 actuates the control bar K and through the link 57 causes the movable arm 58 to rotate the shaft 11 on which the arm 10 is mounted, which in turn causes the conductor strip 14 to move the contactor point 8 radially of the disk 2.

In Figure 4, the arm 58 is also shown as being adjustably fixed upon the shaft 11 so that any movement of the arm 58, through a given arc, transmits motion to the contactor 8 through the same arc, in as much as both arms 10 and 58 are mounted upon the shame shaft. As shown in Figure 4, a bracket bearing support 59 rotatably supports the outer end of the shaft 11. As a means of adjusting and coordinating the movement of the link 57 to effect a movement of the contactor 8 to a greater or lesser extent, the outer end of the arm 58 is provided with a series of openings 60 in which the end of the link 57 may be placed to suit the particular conditions encountered in adapting the variable time current interrupter to the different conditions and environment of use.

Various means may be employed for completing the circuit through the conducting plate 4 on the face of the disk, such for example, as by providing a contactor 61, continuously in engagement with the conducting plate portion 4, said contactor 61 being mounted at the end of a spring pressed contact arm 62 which may be similar in construction to the arm comprising the members 10, 14 and the spring adjustment 15 and 16, excepting, however, that the arm 62 may be supported in a relatively fixed position, on the bracket 12, through means of a suitable insulating means.

As a convenient means of carrying the circuit to the arms 10 and 62, a terminal board 63 may be provided having suitable terminals 64 and 65 leading to the respective arms. A manually operated switch may be provided, the switch terminals being brought out to the terminal board so as to facilitate the connection of the switch in the various circuits as desired.

Figure 6 is a wiring diagram showing the application of the variable time current interrupter to the direct control, through a relay, of the heating elements of an electric furnace. As shown, the control circuit is indicated as being on a 110 volt circuit which may constitute the voltage obtained across the one phase of an alternating current system, and the electric heating elements 67 are shown as connected across a three phase alternating current system. The circuit to the heating element is controlled through switches 68, one switch being in each of the three line terminals, said switch being magnetically controlled by the solenoil 69 connected across one of the phases of the 220 volt circuit, the circuit for said solenoid being controlled through the magnetically controlled switch contacts 70, which contacts in turn are controlled by the relay solenoid 71, which as shown, is connected across the 110 volt circuit through a resistance 72 which permits sufficient current to pass through the relay 71 when not short-circuited through the shunt path provided by the current interrupter which is shown connected in shunt with the coil 71.

As shown in Figure 6, when the two contactors 8 and 61 are in contact with the conductor plate 4 of the disk 2, the relay 71 will be short-circuited and rendered ineffective. However, the resistance 72 is of such value as to prevent a current of too high a value from passing through the interrupter. By using this type of relay and this circuit connection, arcing between the disk and contact is minimized upon current interruption when the contactor 8 is so positioned as to engage the rotating spiral insulating segment 5. As shown, the interrupter is rotated at a substantially constant speed by a self-starting type of telechron synchronous motor, which types usually employ a shading coil about one tip of the pole face of the field to facilitate starting on a single phase alternating current line.

Figure 8 is a wiring diagram similar in many respects to that shown in Figure 6, excepting that the control circuit and the main heating circuit are shown connected across the same line, and also a modified circuit is employed to minimize arcing and sparking upon interruption of the circuit at the current interrupter. Instead of having the interrupter connected in shunt with the relay coil 71, as shown in Figure 6, the variable time current interrupter is connected in series with the relay coil 71 and a very high resistance 73 or a condenser 74 is connected across the terminals 75 and 76 of the interrupter, the values of either the resistance 73 or the capitance of the condenser 74 being so high that when the interrupter is in open circuit position, the current passing through the relay coil 71 will be insufficient to operate the switch contacts 70 to close the same, and further, such current value passing through the resistance 73 will be of such a low value as to enable the armature of the relay 71 to open the contacts 70.

However, the high resistance 73 across the terminal of the variable time current interrupter will serve to minimize if not eliminate the arcing or sparking between the disk and contacts at the time that the circuit is broken at such point. The condenser 74 serves to accomplish the same purpose of minimizing the arcing.

As shown in Figure 8, a pyrometer or thermostat temperature control is shown connected in series with the variable time current interrupter and the relay 71. The remaining portion of the circuit shown in Figure 8 functions substantially as described in considering the heating element 67 in Figure 6. That is, the circuit for the main heating element 67 is completed through the switch contacts 68 which are controlled by a solenoid 69, which solenoid in turn is controlled through contacts 70 of the relay 71.

Figure 7 shows a wiring diagram of a modified arrangement in which an automatic control is employed in obtaining an indirect program control of heating. In such an automatic system, it is necessary to employ a reversible element in order to effect movement of the contactor 8 and its arm 10 in either one direction or the other. In other respects, the diagram of circuits in Figure 7 is substantially similar in substance to those shown in Figure 8. However, in Figure 7 the reversal in lineal radial direction of the contact point 8, is effected through reversal in the rotary direction of the shaft 11 through the gears 78 and 79 mounted on the shaft 11, and on the shaft 80 which is driven through the gear reduction mechanism from either one of the telechron synchronous single phase self-starting but non-reversible type of motor 81 or 82.

The reversal in the direction of the shaft 80 is made possible by turning one of the motors through 180°, and then coupling the driving shafts of each of the motors to a common driving shaft which leads to the speed reduction mechanism 3. Under such an arrangement, if one of the motors 82 is energized through a simple make and break switch connection, the shaft 80 will be driven in, say for example, a clockwise direction. If the circuit for motor 82 is interrupted, and then at the desired time, the circuit for motor 81 is established, the rotation of the shaft 80 will be in a counterclockwise direction. This reversible characteristic is effected without the use of any electrical changeover or reversing switch or a motor, and is also effective without the use of the usual mechanical type of reversing mechanism.

Suitable limit switches 83 and 84 are employed in the circuits of the two motors 81 and 82, respectively, to limit the movement of the contactor 6 on the arm 10, when the contactor has reached its limit of travel radially of the disk face in either one direction or the other. Any suitable arrangement and disposition well known to those skilled in the art may be employed in arrangement of the limit switches in proper relation to the movement of the arm 10, or rotation of the shaft 11.

As shown in Figure 7, the variable time current interrupter is disposed in series with the circuit for the motors controlling the reversible direction of movement of the contactor 8.

We claim:

A variable period current interrupter comprising a substantially constant speed motor, a rotatable disk driven thereby, a radially adjustable contact brush engaging one face of said disk, said disk face presenting to said brush an electrically conducting area and an electrically non-conducting area, the boundary between the said areas extending from the center of the disk along a spiral curve to near the periphery thereof and thence along a bounding radius back to the center, the said spiral being such that a radius through any point on it subtends with the said bounding radius an angle directly proportional to the distance of the said point from the center of the disk, whereby during each rotation of the disk the contact brush rides upon the conducting area for a time substantially directly proportional to the radial adjustment of said brush.

ERNEST G. GUENZEL.
MITCHELL S. KISS.